(12) United States Patent
Maness

(10) Patent No.: US 12,545,504 B2
(45) Date of Patent: Feb. 10, 2026

(54) FRONT-LOADING AND LIFTING REFUSE VEHICLE

(71) Applicant: The Heil Co., Chattanooga, TN (US)

(72) Inventor: Ethan Lee Maness, Rainsville, AL (US)

(73) Assignee: The Heil Co., Chattanooga, TN (US)

( * ) Notice: Subject to any disclaimer, the term of this patent is extended or adjusted under 35 U.S.C. 154(b) by 0 days.

(21) Appl. No.: 19/193,305

(22) Filed: Apr. 29, 2025

(65) Prior Publication Data

US 2025/0340366 A1 Nov. 6, 2025

Related U.S. Application Data

(60) Provisional application No. 63/642,101, filed on May 3, 2024.

(51) Int. Cl.
*B65F 3/04* (2006.01)
*B65F 3/02* (2006.01)

(52) U.S. Cl.
CPC ...... *B65F 3/041* (2013.01); *B65F 2003/0253* (2013.01); *B65F 2003/0259* (2013.01); *B65F 2003/0283* (2013.01)

(58) Field of Classification Search
CPC ............... B65F 3/041; B65F 2003/025; B65F 2003/0253; B65F 2003/0259; B65F 2003/0283

See application file for complete search history.

(56) References Cited

U.S. PATENT DOCUMENTS

| | | | | |
|---|---|---|---|---|
| 3,071,349 | A | * | 1/1963 | Glaze ........................ B66D 1/06 475/8 |
| 3,738,516 | A | * | 6/1973 | Wells ........................ B65F 3/041 414/303 |
| 3,894,642 | A | * | 7/1975 | Shive ........................ B65F 3/041 414/303 |
| 3,996,816 | A | * | 12/1976 | Brighton ............. F16H 55/0833 74/462 |
| 5,607,277 | A | | 3/1997 | Zopf |
| 6,988,864 | B2 | * | 1/2006 | Arrez ........................ B65F 3/041 414/406 |
| 11,414,267 | B2 | * | 8/2022 | Rocholl ................... F16H 19/08 |
| 12,031,638 | B2 | * | 7/2024 | Lovati ..................... F16K 31/54 |
| 12,122,597 | B2 | * | 10/2024 | Boivin ..................... B65F 3/208 |
| 2005/0095096 | A1 | | 5/2005 | Curotto et al. |
| 2020/0346857 | A1 | | 11/2020 | Rocholl et al. |
| 2022/0410688 | A1 | | 12/2022 | Parker et al. |
| 2023/0022718 | A1 | * | 1/2023 | Enting ..................... F03D 15/00 |
| 2023/0312240 | A1 | | 10/2023 | Fraas et al. |
| 2024/0124224 | A1 | | 4/2024 | Schimke et al. |

FOREIGN PATENT DOCUMENTS

| | | | | |
|---|---|---|---|---|
| DE | 102009056077 A1 | * | 6/2011 | ............... B65F 3/04 |
| DE | 202011004125 U1 | * | 6/2011 | ............. B65F 3/046 |
| EP | 1921026 A1 | * | 5/2008 | ............. B65F 3/041 |
| WO | WO-2016015864 A1 | * | 2/2016 | ............. F16D 3/185 |

* cited by examiner

*Primary Examiner* — James Keenan
(74) *Attorney, Agent, or Firm* — Fish & Richardson P.C.

(57) ABSTRACT

An actuator for moving the arm assembly of a front-loading refuse vehicle between a lowered position and a raised position includes two actuator assemblies. The actuator assemblies are coaxially aligned along a pivot axis and uncoupled from one another, lacking intervening structure between them.

20 Claims, 12 Drawing Sheets

FRONT-LOADING AND LIFTING REFUSE VEHICLE

CROSS-REFERENCE TO RELATED APPLICATION

This application claims the benefit under 35 U.S.C. § 119(e) of U.S. Patent Application No. 63/642,101, entitled "Front-Loading and Lifting Refuse Vehicle," filed May 3, 2024, which is incorporated herein by reference in its entirety.

TECHNICAL FIELD

This disclosure relates to the field of refuse collection vehicles.

BACKGROUND

Refuse collection vehicles have been used for generations to collect and transfer waste. Refuse collection vehicles are often characterized based on how they are configured to load waste into an onboard storage container—e.g., a side-loading refuse vehicle, a rear-loading refuse vehicle, and a front-loading refuse vehicle.

Many front-loading refuse vehicles feature a large arm assembly that extends in front of the vehicle's cab to engage a waste container. Once engaged, the arm assembly pivots upward and backward over and behind the cab to dump the contents of the waste container into the onboard storage container. Traditionally, the arm assembly of a front-loading refuse vehicle has been driven by hydraulic cylinders. More recently, alternative designs that seek to move such arm assemblies with electric motor-driven actuators have been explored and disclosed. However, many of these alternative designs have proven either inadequate or impractical.

SUMMARY

Aspects of this disclosure are directed to front-loading refuse collection vehicles.

In one aspect, a refuse collection vehicle includes a cab, a vehicle chassis coupled to the cab, the vehicle chassis defining a forward and rearward direction of travel, and a refuse body coupled to and supported on the vehicle chassis. The refuse body includes a storage container and a front lift. The front lift includes an arm assembly configured to rotate pivotally along a pivot axis between a raised position and a lowered position. The front lift further includes an arm actuator having a first actuator assembly coupled to the arm assembly and a second actuator assembly coupled to the arm assembly. The first actuator assembly and the second actuator assembly are coaxially aligned along the pivot axis and operatively uncoupled from one another along the pivot axis.

In another aspect combinable with the previous aspect, the first actuator assembly and the second actuator assembly are physically uncoupled from one another along the pivot axis.

In another aspect combinable with one or more of the previous aspects, at least one of the first actuator assembly or the second actuator assembly includes an output shaft directly connected to a front arm of the arm assembly by a torque-transmitting coupling.

In another aspect combinable with one or more of the previous aspects, the first actuator assembly includes a first electric motor and a first gear set, and the second actuator assembly includes a second electric motor and a second gear set.

In another aspect combinable with one or more of the previous aspects, the refuse collection vehicle further includes a controller configured to control operation of both the first electric motor and the second electric motor.

In another aspect combinable with one or more of the previous aspects, the first actuator assembly and the second actuator assembly are logically uncoupled, such that the controller is configured to control operation of the first electric motor independent of the second electric motor.

In another aspect combinable with one or more of the previous aspects, the controller is configured to control the first electric motor to rotate according to a first rotational direction and to control the second electric motor to rotate according to a second rotational direction that is different from the first rotational direction.

In another aspect combinable with one or more of the previous aspects, the controller is configured to control the first electric motor and the second electric motor to output substantially similar shaft speed or torque.

In another aspect combinable with one or more of the previous aspects, the controller is configured to detect a failure of the first electric motor and, in response to detecting the failure, modify operation of the second electric motor.

In another aspect combinable with one or more of the previous aspects, the controller is configured to modify operation of the second electric motor by increasing a magnitude of a supply voltage to the second electric motor.

In another aspect combinable with one or more of the previous aspects, the controller is configured to modify operation of the second electric motor by reversing a polarity of a supply voltage to the second electric motor.

In another aspect combinable with one or more of the previous aspects, the first electric motor and the second electric motor are structurally identical, and the first gear set and the second gear set are structurally identical.

In another aspect combinable with one or more of the previous aspects, at least one of the first gear set or the second gear set includes an epicyclic arrangement with three reduction stages.

In another aspect combinable with one or more of the previous aspects, at least one of the first gear set or the second gear set has a length-to-diameter ratio of between 4 and 11, such as between 6 and 10, between 7 and 9, and/or about 8.

In another aspect combinable with one or more of the previous aspects, at least one of the first gear set or the second gear set has a total gear ratio of between 97 and 229, such as between 130 and 196, between 146 and 180, and/or about 163.

In another aspect combinable with one or more of the previous aspects, at least one of the first electric motor or the second electric motor has a length-to-diameter ratio of between 0.7 and 1.8, such as between 1.0 and 1.5, between 1.1 and 1.4, and/or about 1.2.

In another aspect combinable with one or more of the previous aspects, at least one of the first actuator assembly or the second actuator assembly has a torque density of between 778-1,817 Nm/inch, such as between 1,038 and 1,558 Nm/inch, between 1,167 and 1,427 Nm/inch, and/or about 1,298 Nm/inch.

In another aspect combinable with one or more of the previous aspects, the arm actuator resides rearward of the cab and rearward of a front axle of the vehicle chassis.

In another aspect combinable with one or more of the previous aspects, the refuse body includes a pair of exterior side walls, and a portion of the arm actuator resides within a limited space that extends no further in a transverse direction than an extent of the exterior side walls.

In another aspect combinable with one or more of the previous aspects, the portion of the arm actuator includes at least a majority of a total mass of the arm actuator.

Embodiments described in the present specification provide an electric motor-driven actuator for moving the arm assembly of a front-loading refuse vehicle between a lowered position and a raised position. The arm actuator of these embodiments is particularly compact and light weight, which is advantageous in multiple respects. The small volume envelope of the described arm actuator accommodates tight space constraints, and the reduced weight relieves concerns associated with overloading the front axle of the vehicle chassis. Additionally, and as discussed further below, the arm actuator described in the embodiments of this disclosure provides ample redundancy and resiliency in the event of a partial system failure.

Various additional features, objects, and advantages will be apparent from the following description and drawings, and from the claims.

DETAILED DESCRIPTION

Embodiments of the present disclosure feature an electric motor-driven actuator for moving the arm assembly of a front-loading refuse vehicle between a lowered position and a raised position. In some embodiments, the actuator features two actuator assemblies, each driving a respective front arm of the arm assembly. In some embodiments, the actuator assemblies are uncoupled from one another, lacking intervening structure between them, and controlled independently of one another. Such a configuration is light weight, compact, and resilient to partial failure.

Figure 1:
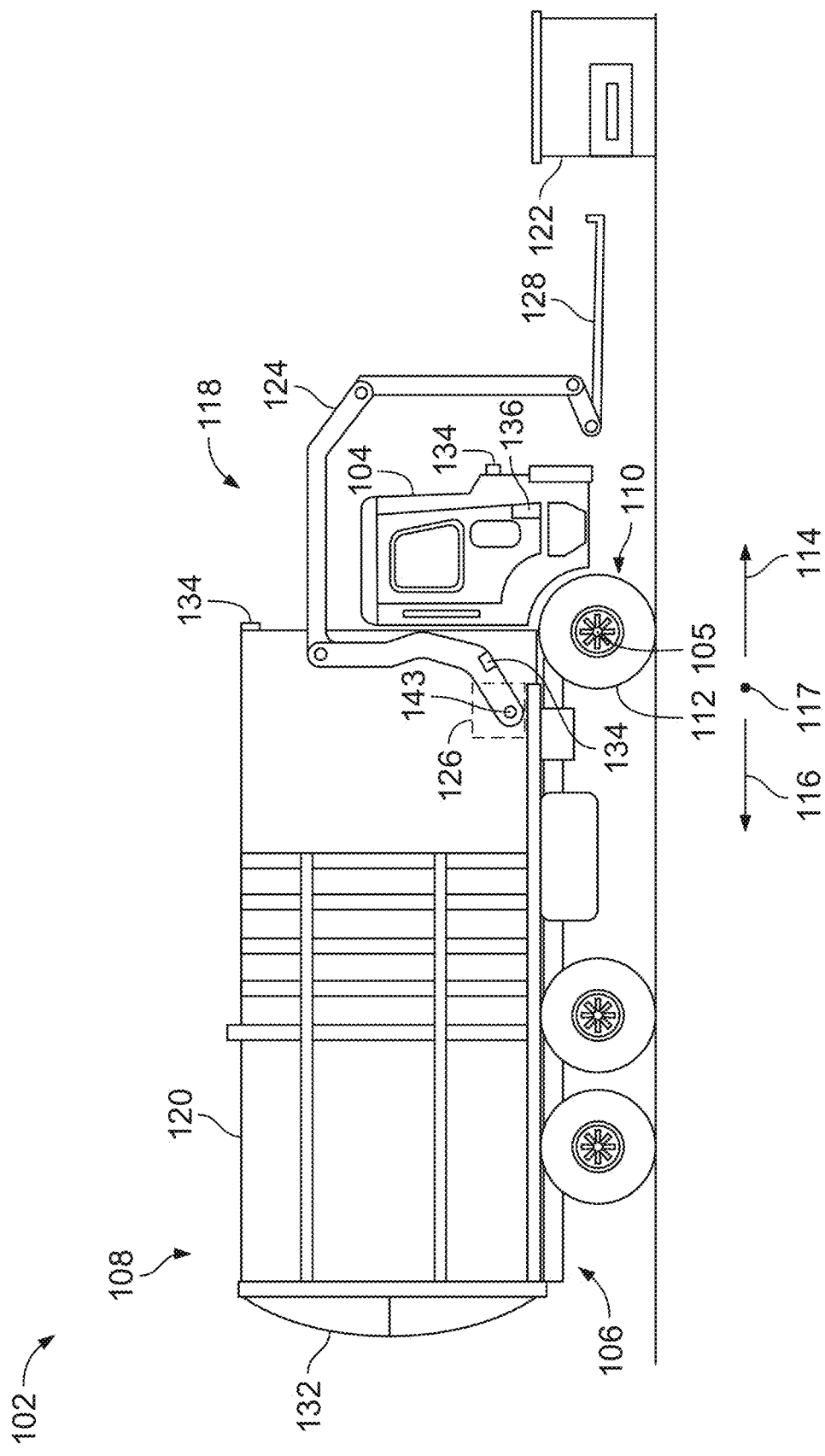
FIG. 1 is a side view of a front-loading refuse collection vehicle including a front lift assembly within the scope of the present disclosure.
Figure 2A:
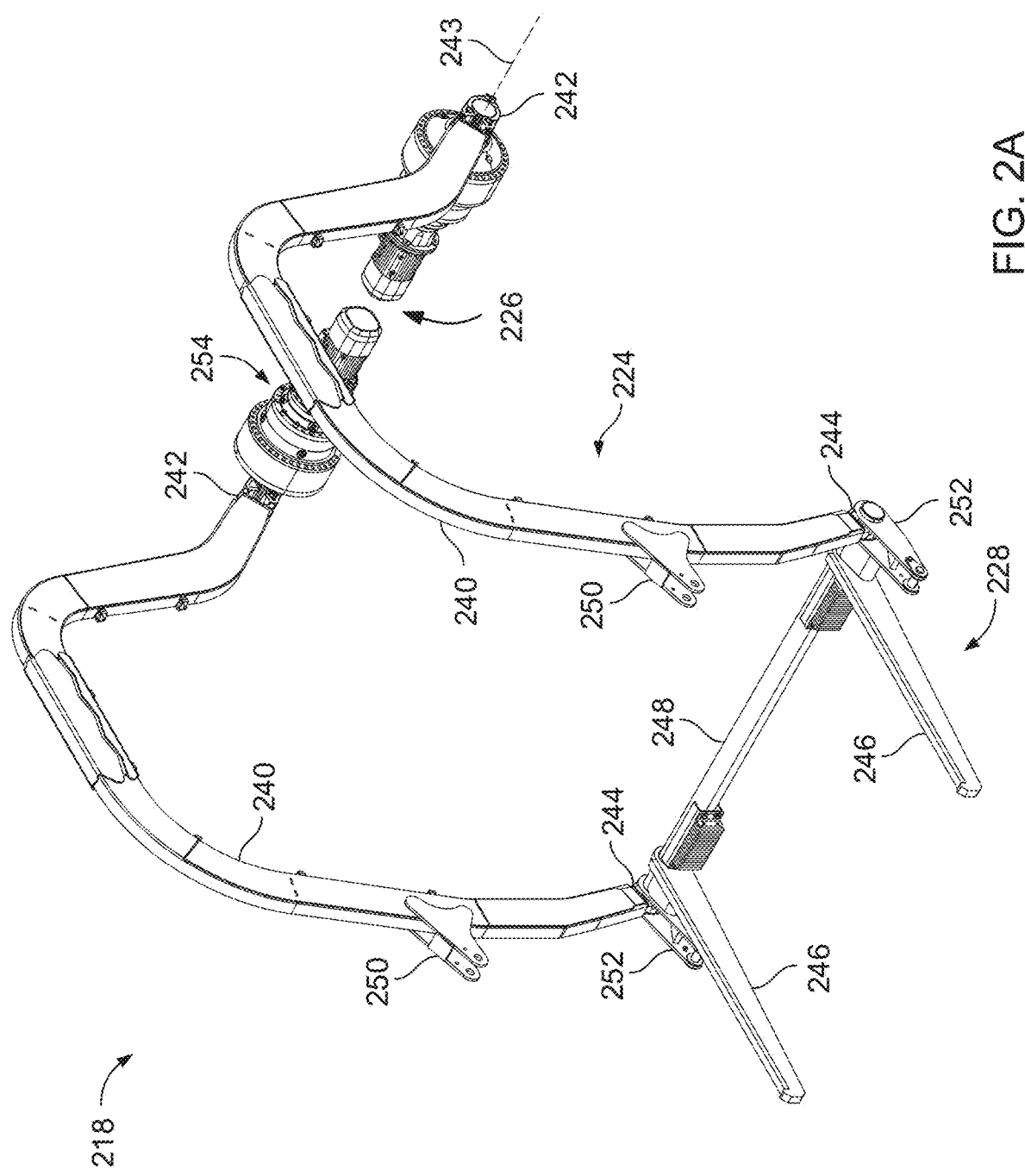
FIG. 2A is a perspective view of a front lift assembly.
Figure 2B:
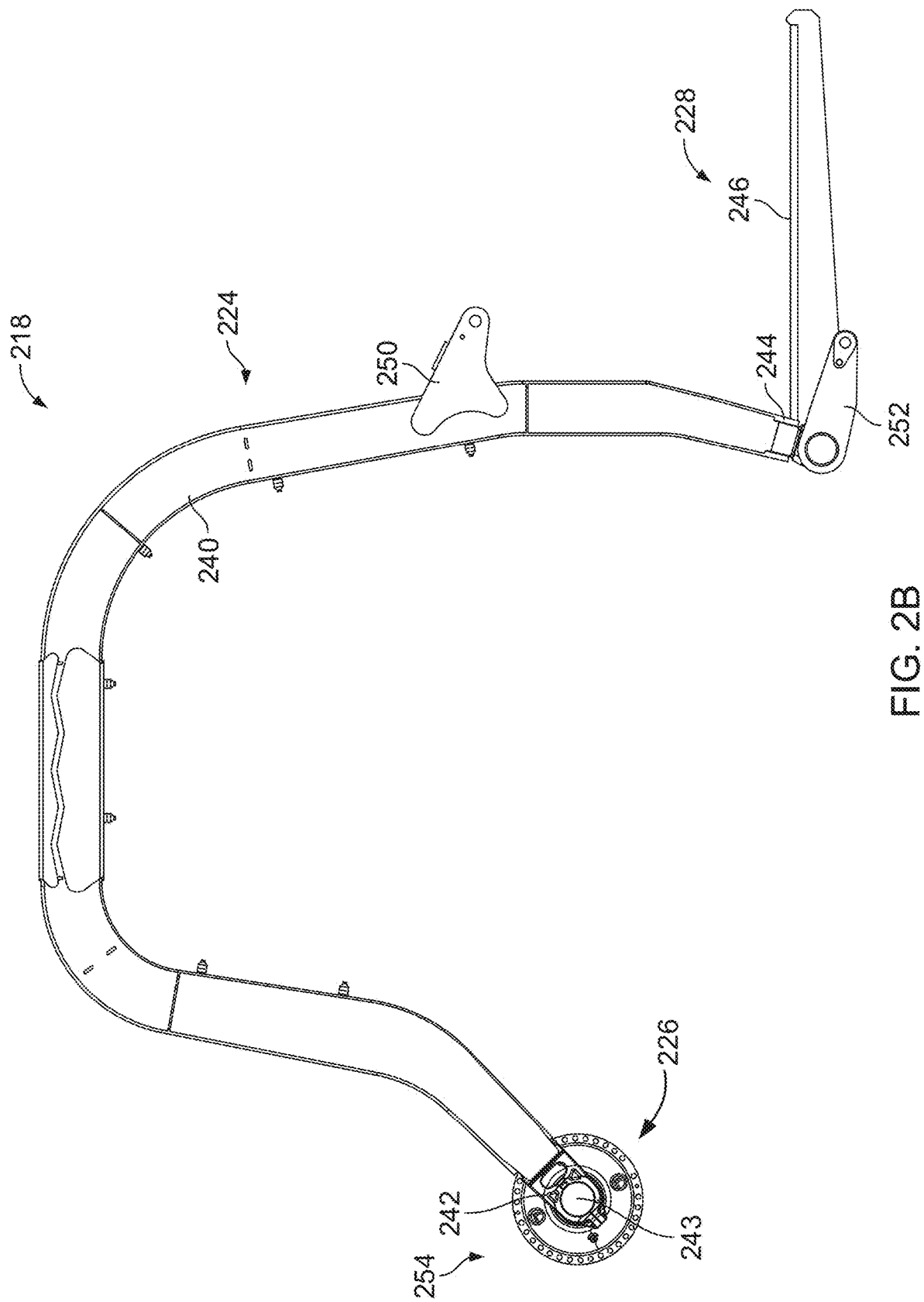
FIG. 2B is a side view of the front lift assembly of FIG. 2A.
Figure 2C:
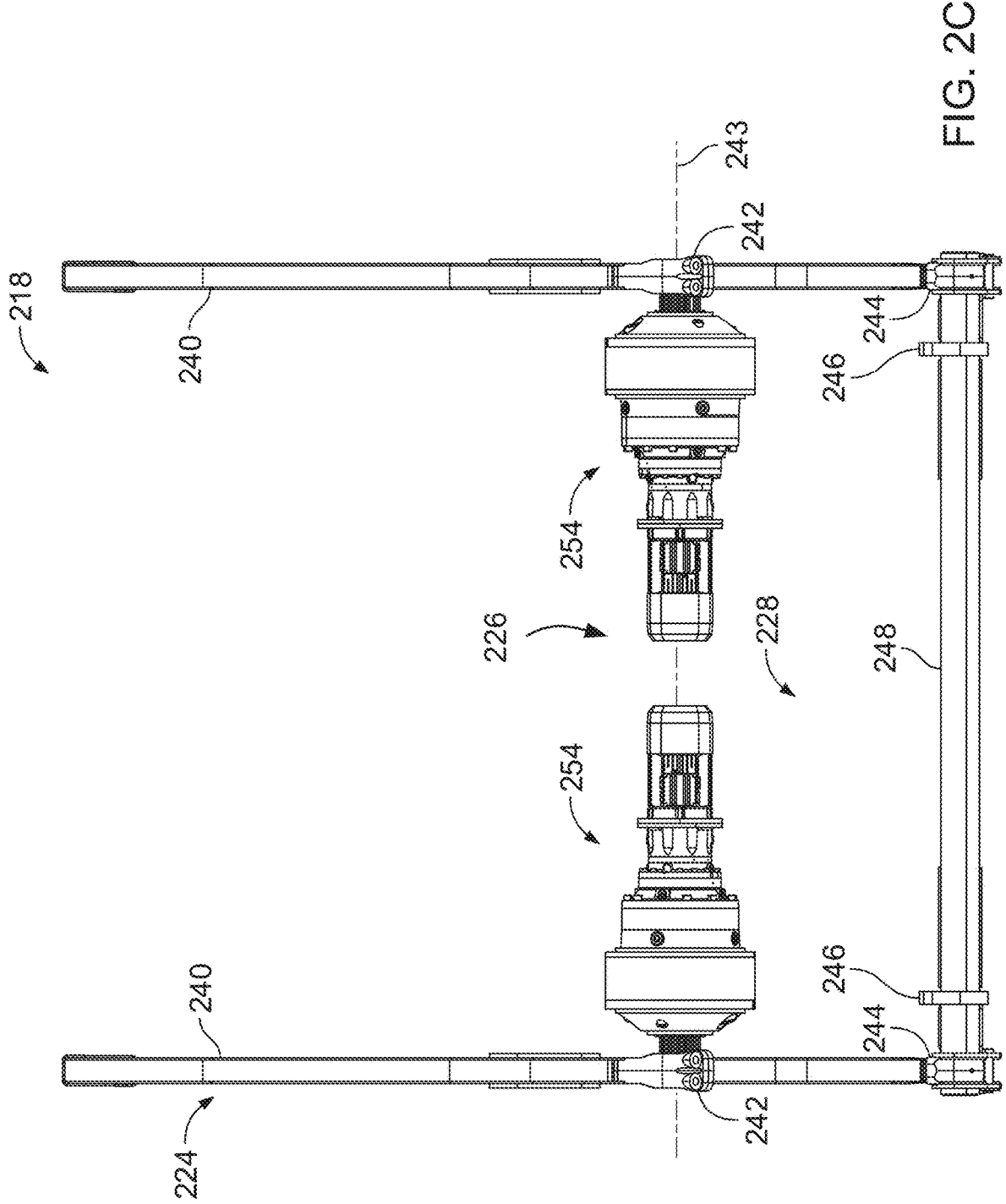
FIG. 2C is a rear view of the front lift assembly of FIG. 2A.
Figure 2D:
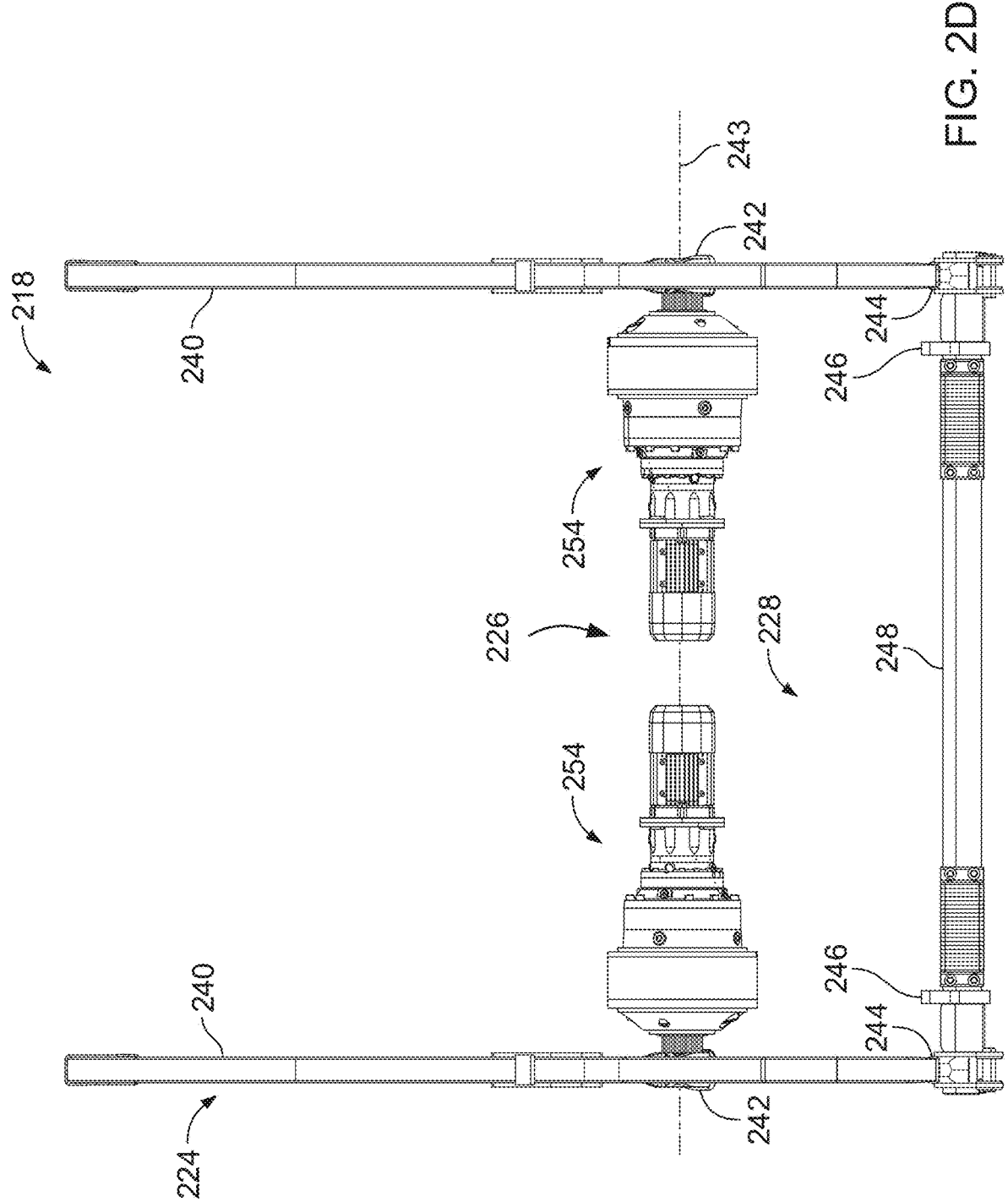
FIG. 2D is a front view of the front lift assembly of FIG. 2A.
Figure 2E:
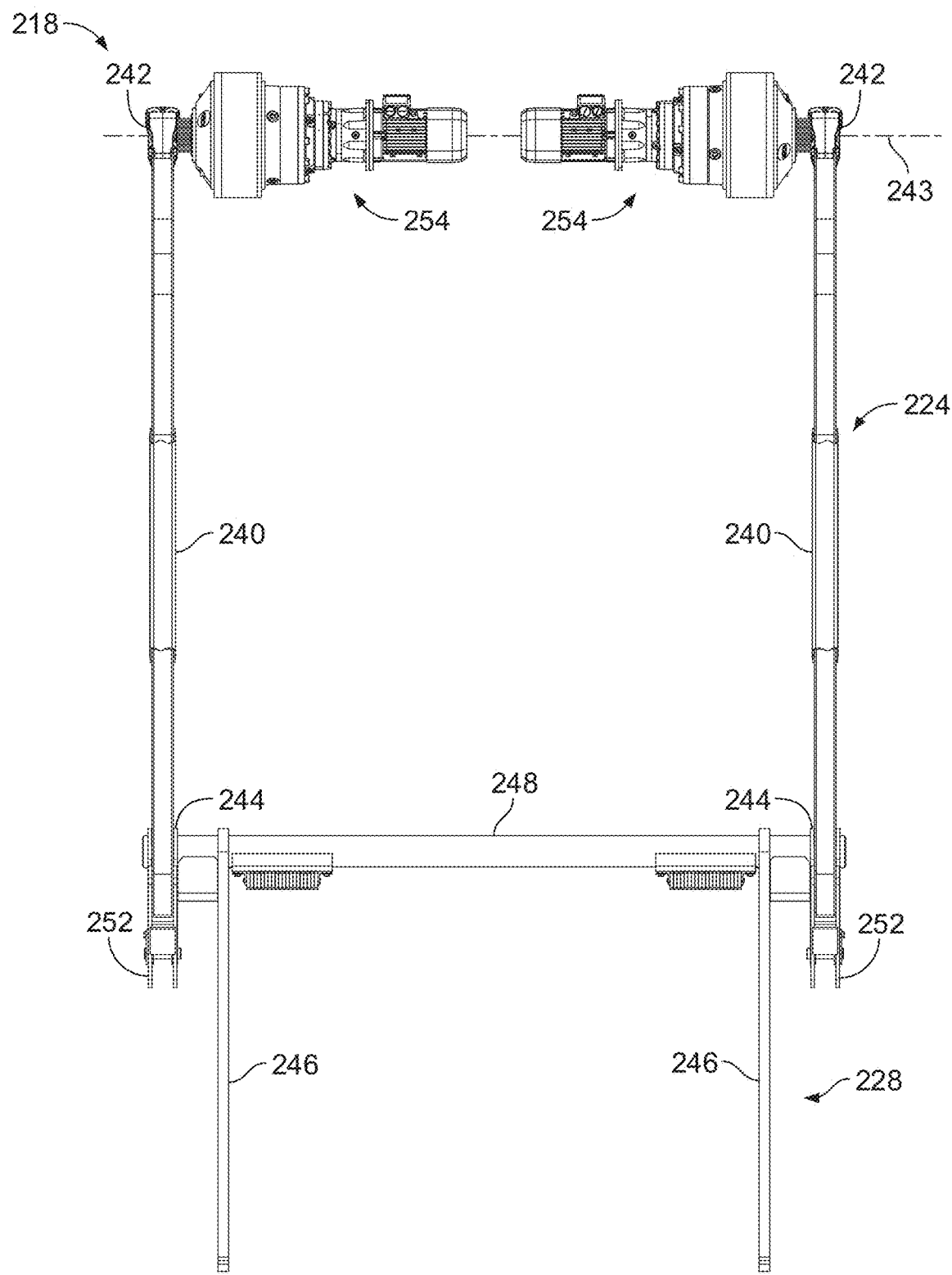
FIG. 2E is a top view of the front lift assembly of FIG. 2A.

FIG. 1 depicts a vehicle 102 for collecting and transporting refuse (e.g., garbage). Refuse collection vehicles such as vehicle 102 are often described colloquially as a garbage collection vehicles or just "garbage trucks."

Refuse collection vehicle 102 includes a cab 104, a chassis 106, and a refuse collecting body 108. Cab 104 includes a compartment for a driver of vehicle 102. The compartment is equipped with controls that enable the driver to operate various elements of chassis 106 and body 108. Chassis 106 includes a power train 110 (e.g., a diesel, CNG, or electric power train). Power train 110, which includes a prime mover and a drivetrain, converts and transfers motive power to the wheels 112 that move vehicle 102 on a road surface along a forward direction of travel 114 and a rearward direction of travel 116. For ease of discussion, we reference the direction across vehicle 102 and orthogonal to the forward/rearward directions as a transverse direction 117.

Vehicle 102 is a front-loading refuse collecting vehicle. Accordingly, refuse collecting body 108, which is coupled to chassis 106, includes a front lift 118 and a storage container 120. Front lift 118 includes an arm assembly 124 driven by an arm actuator 126 and a fork assembly 128 driven by a fork actuator (not shown). Arm assembly 124 rotates pivotally along a pivot axis 143 (which is parallel to transverse direction 117) relative to chassis 106 and storage container 120.

Arm actuator 126 resides proximate storage container 120, behind cab 104 and behind the front axle 105 of chassis 106. In this example, at least the majority (e.g., the entirety) of the mass of the arm actuator 126 resides in a limited space that extends no further in transverse direction 117 than the extent of the exterior lateral side walls of storage container 120. Positioning arm actuator 126 in this manner introduces unique space constraints in the sense that the volume envelope of arm actuator 126 may affect the available positioning and size—and therefore storage capacity—of storage container 120.

During use, arm actuator 126 drives arm assembly 124 to rotate between a lowered position and a raised (dump) position as part of a manual or automated dump cycle. In one exemplary dump cycle, front lift 118, via fork assembly 128, engages a waste container 122 located on the ground in front of the cab 104. Next, front lift 118 lifts waste container 122 above cab 104 by driving arm assembly 124 to rotate via arm actuator 126. Front lift 118 then dumps the contents of waste container 122 into storage container 120 by rotating fork assembly 128 with the fork actuator.

Additional operational components of refuse collecting body 108 include a packer (not shown) for packing waste within storage container 120, a pivoting tailgate 132 for controlling access to an opening of storage container 120, and an ejector (not shown) for expelling waste from storage container 120 when tailgate 132 is pivoted upward to an open position.

Vehicle 102 can include a suite of sensing devices 134 (e.g., sensors and/or detectors) monitoring the state of the surrounding environment and/or the state of the operational components of chassis 106 and body 108. Sensing devices 134 are responsive to physical stimuli associated with the monitored aspect of the environment or operational components and output corresponding digital or analog data signals. The data signals from sensing devices 134 are communicated to an onboard computing device 136 in the cab 104 of vehicle 102. Onboard computing device 136 processes the data signals to determine the state of the monitored environment or operational component, e.g., the presence of an external object (e.g., a residential or commercial waste container), the relative position of an element of the front lift 118, or the status of an onboard battery or fuel source.

FIGS. 2A-2E depict an example front lift 218 that may be employed in a front-loading refuse vehicle such as vehicle 102 in FIG. 1. Consistent with the above discussion of FIG. 1, front lift 218 includes an arm assembly 224 driven by an arm actuator 226 and a fork assembly 228 driven by a fork actuator (not shown).

Arm assembly 224 includes a pair of front arms 240. Each of front arms 240 has a U-shaped structure extending from a proximal arm end 242 to a distal arm end 244. Proximal arm end 242 is held in a translationally fixed position while being permitted to rotate relative to the vehicle chassis and the remainder of the refuse collecting body along a pivot axis 243. Distal arm end 244 is coupled to fork assembly 228, which includes a pair of forks 246 connected by a cross bar 248. Components (e.g., hydraulic cylinders, electric motors, linear/rotary actuators) of the fork actuator that drive forks 246 to rotate pivotally relative to the front arms 240 are mountable to arm mounting brackets 250 and fork mounting brackets 252.

Arm actuator 226 rotationally drives the proximal arm ends 242 of front arms 240 about pivot axis 243 to pivotally rotate the arms between a raised position and a lowered position (e.g., during a dump cycle). As noted above with reference to FIG. 1, arm actuator 226 resides behind the front axle and cab of the refuse vehicle, positioned such that at least the majority of its mass is within a limited space that extends no further in the transverse direction (which is parallel to pivot axis 143) than the extent of the exterior lateral side walls of the body's storage container.

Arm actuator 226 includes a pair of actuator assemblies 254. Actuator assemblies 254 are aligned coaxially and share a common axis of rotation along pivot axis 243, one facing away from the other. The coaxial arrangement of actuator assemblies 254 is compact and space efficient, narrowing the volume envelope of arm actuator 226.

Actuator assemblies 254 are uncoupled from one another. For example, actuator assemblies are "operatively uncoupled" along pivot axis 243, meaning there is no physical structure that (1) intersects or overlaps pivot axis 243, (2) connects the actuator assemblies 254 to one another, and (3) is required to operate the functional (e.g., rotating) components of either actuator assembly 254. As another example, actuator assemblies 254 are also physically uncoupled along the pivot axis 243, meaning there is no physical structure that (1) intersects or overlaps pivot axis 243 and (2) connects the actuator assemblies to one another. As yet another example (discussed further below), actuator assemblies 254 are also "logically uncoupled," meaning that one actuator assembly is controlled independently of the other. Note that when describing the relationship between actuator assemblies 254, the term "uncoupled" left unqualified includes but is not limited to all of the foregoing examples.

Eliminating connective structure between actuator assemblies 254 reduces the overall weight of arm actuator 226. Given that the vehicle chassis is limited in the amount of weight it can support (especially at or near the front axle), decreasing the weight of arm actuator 226 can be particularly advantageous.

In this example, actuator assemblies 254 are structurally identical, meaning that the structural components of each assembly have equivalent design specifications. Accordingly, the following description applies equally to both of actuator assemblies 254. Referring to FIGS. 3A-3D, each of actuator assemblies 254 includes an electric motor 260 (e.g., a direct current permanent magnet motor) and a gear set 262 arranged coaxially along pivot axis 143. Electric motor 260 directly drives gear set 262, and gear set 262 directly drives proximal arm end 242. The term "directly" in this context refers to the lack of intervening operational drive components between electric motor 260 and gear set 262, and between gear set 262 and proximal arm end 242.

Electric motor 260 includes a drive shaft 264 coupled to an input gear 266 of gear set 262. In addition to input gear 266, gear set 262 further includes three epicyclic (e.g., planetary or sun) gear reduction stages 268, 270, 272 and an output shaft 274. Each of gear reduction stages 268, 270, 272 provides a step up in torque with a corresponding step down in speed according to their respective gear ratios. Accordingly, gear set 262 converts the relatively high speed, low torque output of electric motor 260 into a relatively low speed, high torque output at output shaft 274.

Figure 3A:
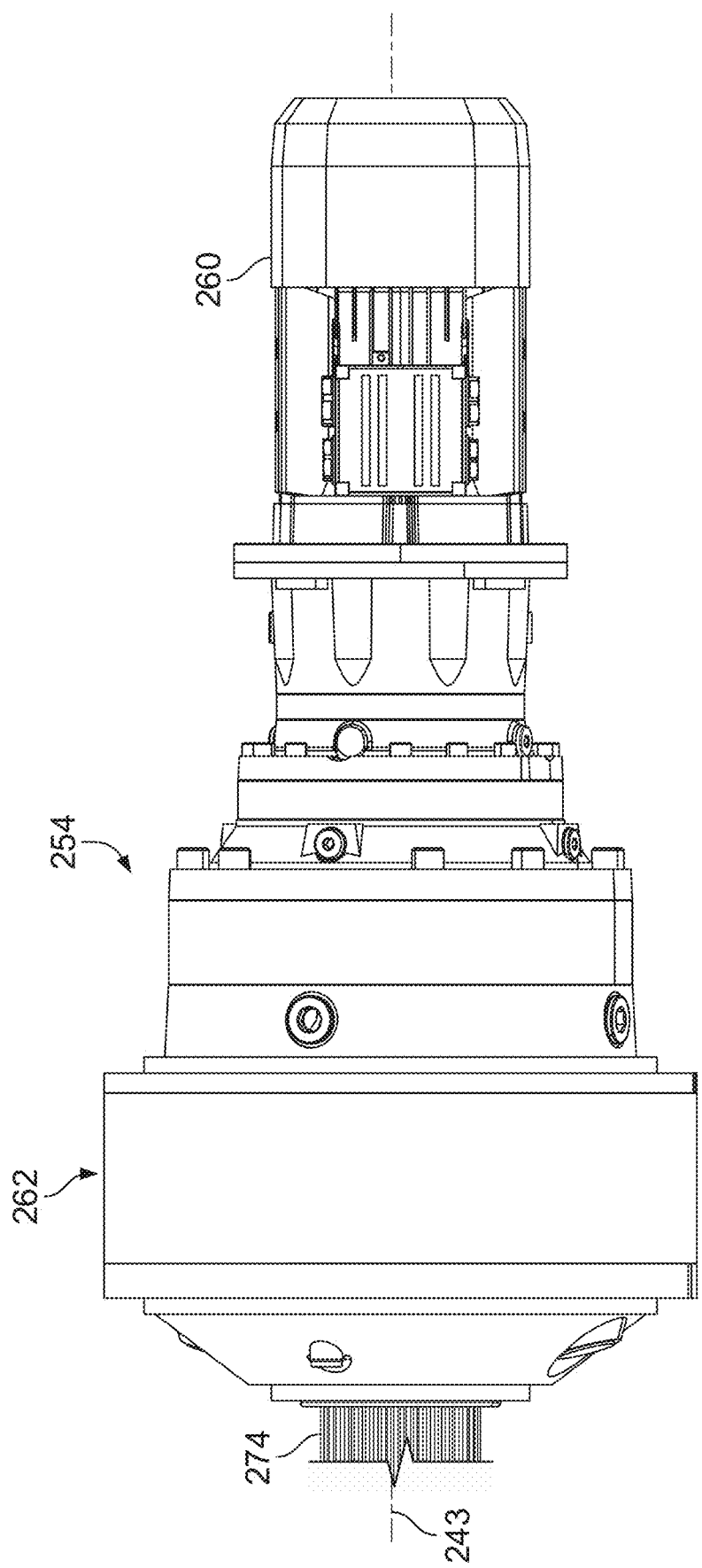
FIG. 3A is a side view of an actuator assembly.
Figure 3B:
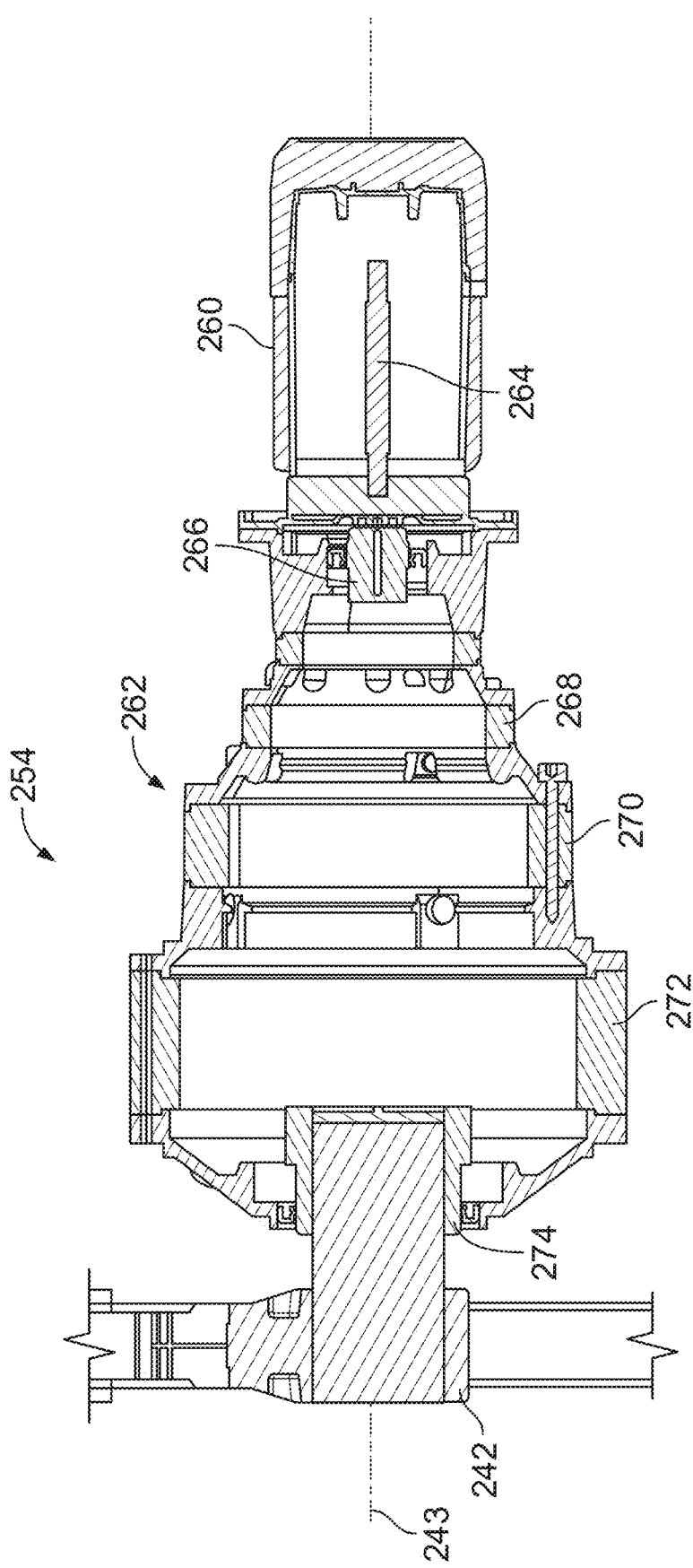
FIG. 3B is a cross-sectional side view of the actuator assembly of FIG. 3A.
Figure 3C:
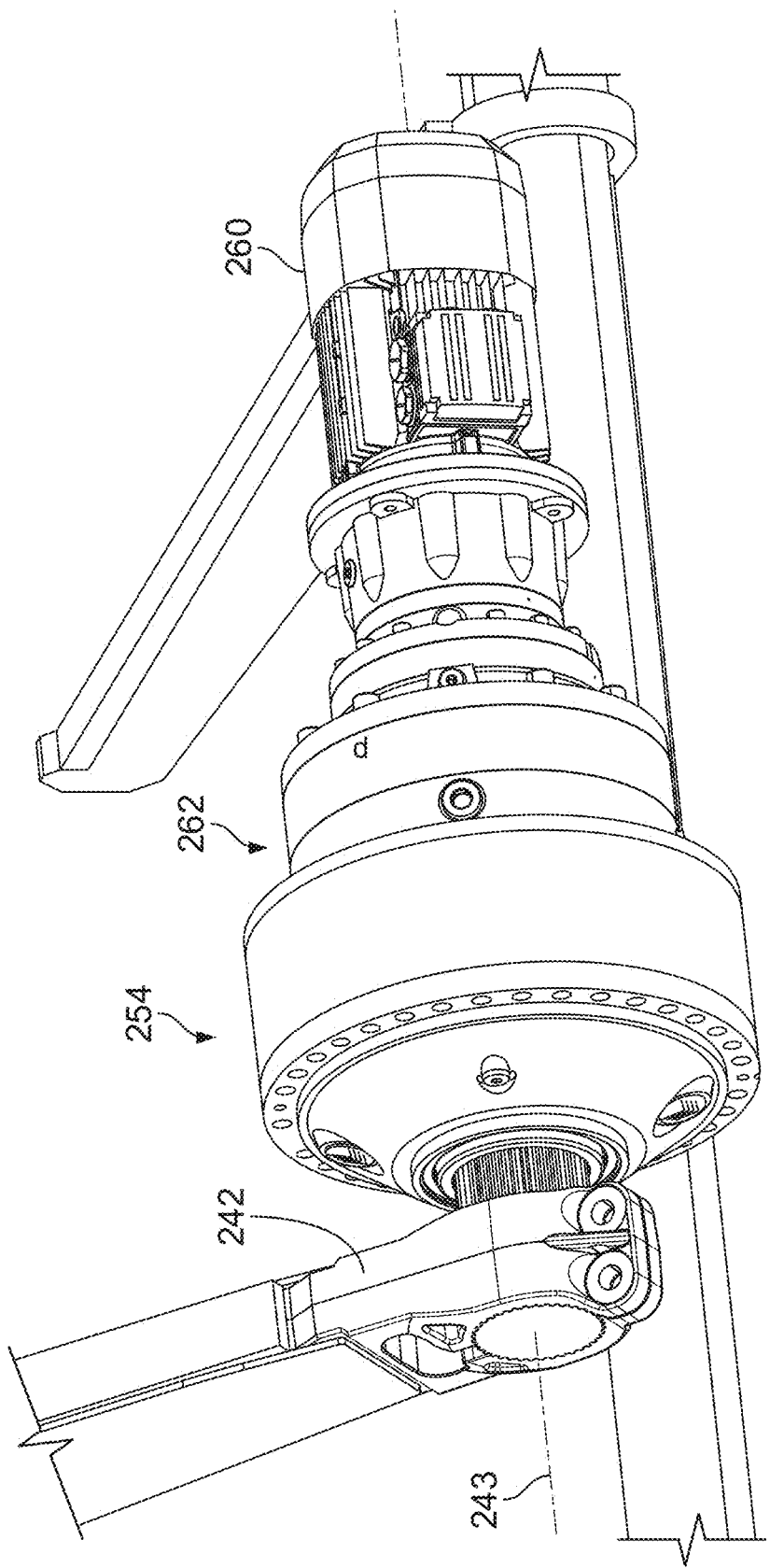
FIG. 3C is a perspective view of the actuator assembly of FIG. 3A illustrating a connection between the actuator assembly and the proximal end of a front arm.
Figure 3D:
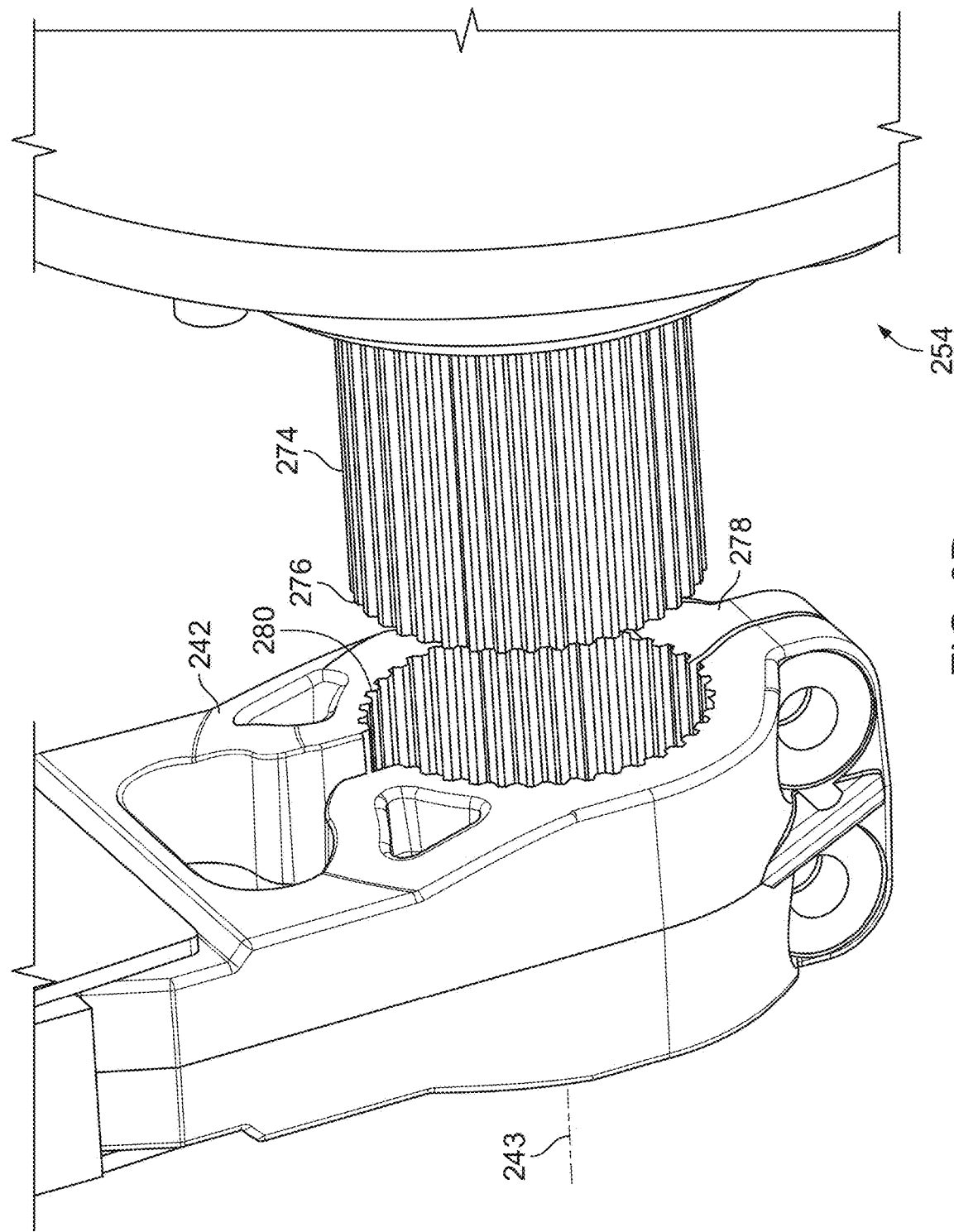
FIG. 3D is a perspective exploded view of the connection shown in FIG. 3C.

As shown in FIG. 3D, the outer circumferential surface of output shaft 274 includes a set of axial splines 276 that engage with a set of mating axial splines 280 on an interior circumferential surface of a forged or cast clamping shaft collar 278 at proximal arm end 242. The mating splines 276, 280 create a suitable mechanical connection for transferring torque from output shaft 274 to proximal arm end 242 while inhibiting slippage (e.g., unintentional relative rotation).

In some embodiments, electric motor 260 has a voltage rating of between 120-280 Vdc, such as between 160-240 Vdc, between 180-220 Vdc, and/or about 200 Vdc. The term "about" in this disclosure, when used to describe a numerical range or value, references a margin within ±5% of the stated value or range. In some embodiments, electric motor 260 has a speed rating of between 900-2,100 RPM, such as between 1,200-1,800 RPM, between 1,350-1,650 RPM, and/or about 1,500 RPM. In some embodiments, electric motor 260 has a torque rating of between 186-436 Nm, such as between 248-374 Nm, between 279-343 Nm, and/or about 311 Nm.

Electric motor 260 has a volume envelope associated with its total length (i.e., the distance between the ends of the motor in a direction parallel to pivot axis 243) and maximum diameter (i.e., the largest extent of the motor in a direction orthogonal to pivot axis 243). The volume envelope relates to the amount of space occupied by electric motor 260. In some embodiments—e.g., to accommodate space constraints associated with the location of arm actuator 226 relative to the vehicle chassis and refuse collecting body—the total length of electric motor 260 is between 8-20 inches, such as between 11-17 inches, between 12-16 inches, and/or about 14 inches. In some embodiments, the maximum diameter of electric motor 260 is between 6-16 inches, such as between 9-14 inches, between 12-13 inches, and/or about 11 inches. In some embodiments, the length-to-diameter ratio of electric motor 260 is between 0.7-1.8, such as between 1.0-1.5, between 1.1-1.4, and/or about 1.2.

In some embodiments, gear set 262 has a total gear ratio (i.e., a gear ratio accounting for any/all included gear reduction stages) of between 97-229, such as between 130-196, between 146-180, and/or about 163.

Gear set 262 has a volume envelope associated with its total length (i.e., the distance between the ends of the gear set in a direction parallel to pivot axis 243) and maximum diameter (i.e., the largest extent of the gear set in a direction orthogonal to pivot axis 243). The volume envelope relates to the amount of space occupied by gear set 262. In some embodiments—e.g., to accommodate space constraints associated with the location of arm actuator 226 relative to the vehicle chassis and refuse collecting body—the total length of gear set 262 is between 15-36 inches, such as between 20-31 inches, between 22-28 inches, and/or about 25 inches. In some embodiments, the maximum diameter of gear set 262 is between 10-25 inches, such as between 14-21 inches, between 15-20 inches, and/or about 17.5 inches. In some embodiments, the length-to-diameter ratio of gear set 262 is between 4-11, such as between 6-10, between 7-9, and/or about 8.

As discussed, in the example of FIG. 1, at least a majority of the mass of arm actuator 226 resides within a limited space that extends no further in the transverse direction than the extent of the exterior lateral side walls of the body's storage container. In some embodiments, this transverse extent of the storage container is no greater than 102 inches. In such embodiments, the total length of each of actuator assemblies 254 may be no greater than 51 inches to accommodate their coaxial alignment and physically and/or operatively uncoupled relationship.

As discussed, actuator assemblies 254 transmit torque and rotational movement to proximal arm ends 242. Moving front arms 240 from a fully lowered position to a fully raised position requires actuator assemblies 254 to provide a certain maximum degree of rotation (e.g., between 90-115 degrees, such as 105 degrees). The amount of time required to accomplish this maximum degree of rotation is the "cycle time." Moving front arms 240 from a fully lowered position to a fully raised position further requires actuator assemblies 254 to produce sufficient torque to accommodate a load carried by the front arms-such as a large waste container or carry can attached to the forks. In some embodiments, actuator assemblies 254 provide sufficient torque and speed output to maintain a cycle time between 7-17 seconds, between 9-15 seconds, between 10-14 seconds, and/or about 12 seconds with a load (e.g., container or carry can) carried by the arms of up to 6,500 lb. In some embodiments, each of actuator assemblies 254 provides a torque output rating of between 30,480-71,120 Nm, such as between 40,640-60,960 Nm, between 45,720-55,880 Nm, and/or about 50,800 Nm.

Consistent with the discussion above, actuator assemblies 254 may face atypical output requirements and space constraints that stem from the above-discussed unconventional arrangement and positioning of arm actuator 226. Accordingly, the inventor(s) associated with this disclosure have discovered the unique advantage of configuring each of actuator assemblies 254 to have a "torque density"—i.e., the ratio of output torque rating to total length along the pivot axis—of between 778-1,817 Nm/inch, such as between 1,038-1,558 Nm/inch, between 1,167-1,427 Nm/inch, and/or about 1,298 Nm/inch.

Figure 4:
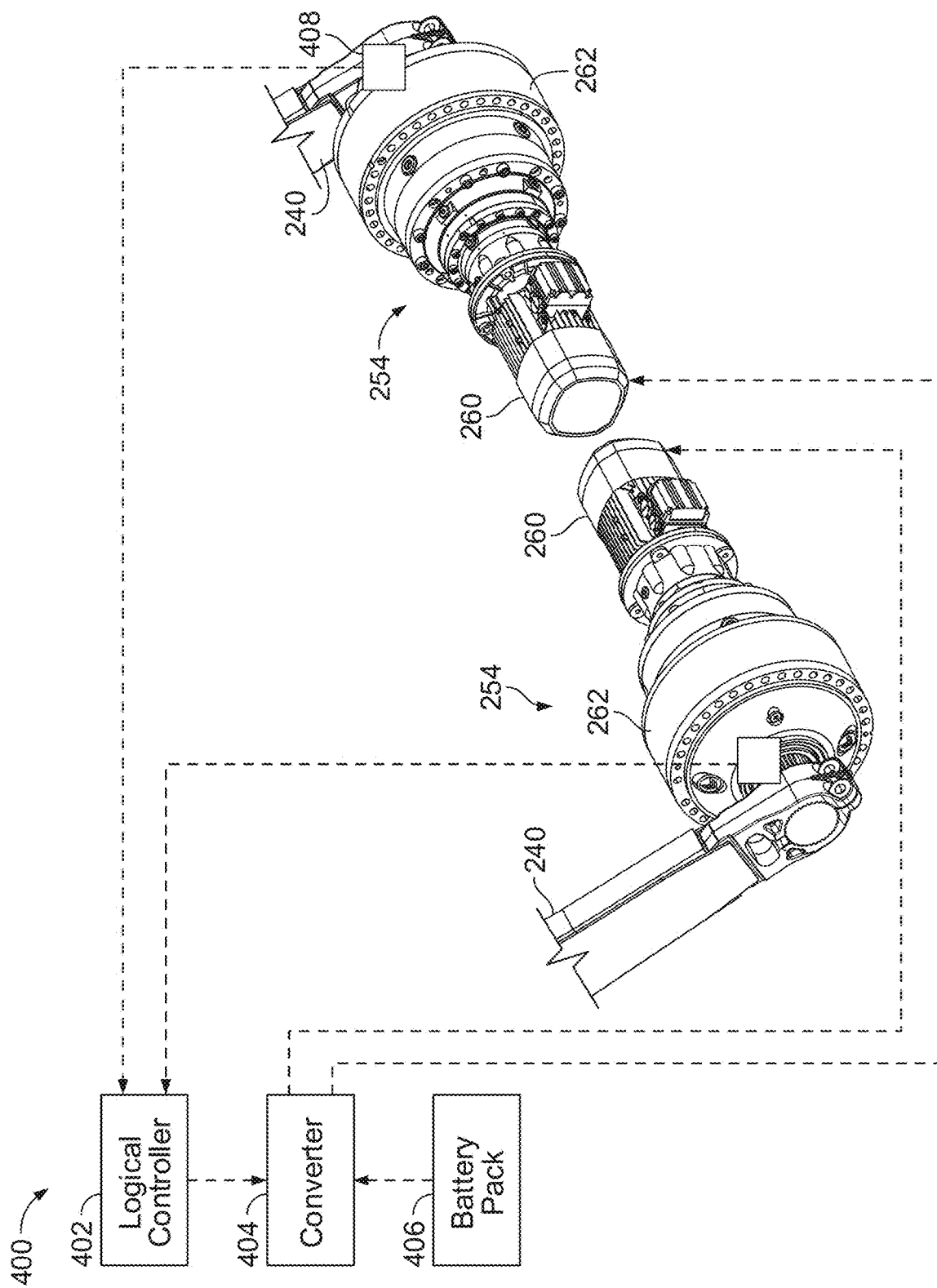
FIG. 4 is a diagram illustrating a feedback control loop for controlling the operation of two actuator assemblies.

FIG. 4 illustrates an exemplary feedback control loop 400 for operating actuator assemblies 254 to pivotally rotate front arms 240 (e.g., during a dump cycle). As shown, control loop 400 includes a logical controller 402 in communication with a converter 404 (e.g., a battery controller). Converter 404 is in communication with a battery pack 406 and the electric motor 260 of each actuator assembly 254. Converter 404 conveys electrical current from battery pack 406 to electrical motor 260 while regulating the supply voltage. By regulating the supply voltage, converter 404 dictates the torque and speed output of electric motors 260 and (therefore) actuator assemblies 254, which, in turn, dictates the pivotal rotation of front arms 240. In this example, converter 404 is a pulse width modulation (PMW) converter.

Logical controller 402 is also in communication with actuator sensing devices 408 monitoring each of actuator assemblies 254. Logical controller 402 receives and processes data output signals from actuator sensing devices 408 to determine a position (e.g., an angular position) and/or a speed associated with the operation of actuator assemblies 254. In this example, actuator sensing devices 408 include a rotary encoder monitoring and outputting data signals representing the angular position of output shaft 274 of the gear set 262. This angular position of output shaft 274 indicates and corresponds to the position of front arms 240. Accordingly, to control movement of the arms (e.g., during a dump cycle), logical controller 402 executes a feedback control scheme (e.g., a PID control scheme), providing control instructions to converter 404 based on the position and/or speed information determined from the data signals output by actuator sensing devices 408.

As discussed, actuator assemblies 254 are "logically uncoupled," meaning that one actuator assembly is controlled independently of the other by logical controller 402. The above-discussed feedback control scheme executed by logical controller 402 accounts for synchronizing the operation of the independently-controlled actuator assemblies 254, such that front arms 240 move in tandem (e.g., both arms moving up or down at the same time) and remain balanced. As one example, logical controller 402, via the feedback control scheme, may synchronize the operation by causing electrical motors 260 to output substantially similar (i.e., within 5%) shaft speed and/or torque.

Additionally, logical controller 402 can provide instructions to converter 404 that cause the supply voltage conveyed to one of the motors 260 to have reversed polarity relative to the supply voltage conveyed to the other of the motors 260. The reversed polarity causes motors 260 to turn in opposite clockwise/counterclockwise directions, which moves front arms 240 in tandem despite the opposite orientation of the coaxially arranged actuator assemblies 254. Turning the motors in opposite directions in this way can eliminate the need for additional gearing and any concomitant cost, weight, and efficiency penalties in the design of arm actuator 226.

Because actuator assemblies 254 are uncoupled, logical controller 402 can continue operating one of the actuator assemblies even if the other fails. In one example, the control scheme executed by logical controller 402 calls for eliminating the current flow to one of the actuator assemblies 254 experiencing an operational failure during a lift operation. At the same time, the control scheme executed by logical controller 402 determines based on the circumstances (e.g., the position of front arms 240, the weight of the load carried by front arms 240) whether to continue the lift operation by increasing the supply voltage to the electric motor 260 of the actuator assembly 254 that remains operable or to halt the lift operation. If the logical controller 402 determines to halt the lift operation, the control scheme further calls for issuing instructions to halt movement of front arms 240 (e.g., by temporarily locking the arms in place) and/or operating the electric motor 260 of the actuator assembly 254 that remains operable to execute a controlled decent of front arms 240 (e.g., by changing the polarity of the supply voltage and/or reducing the supply voltage).

Figure 5:
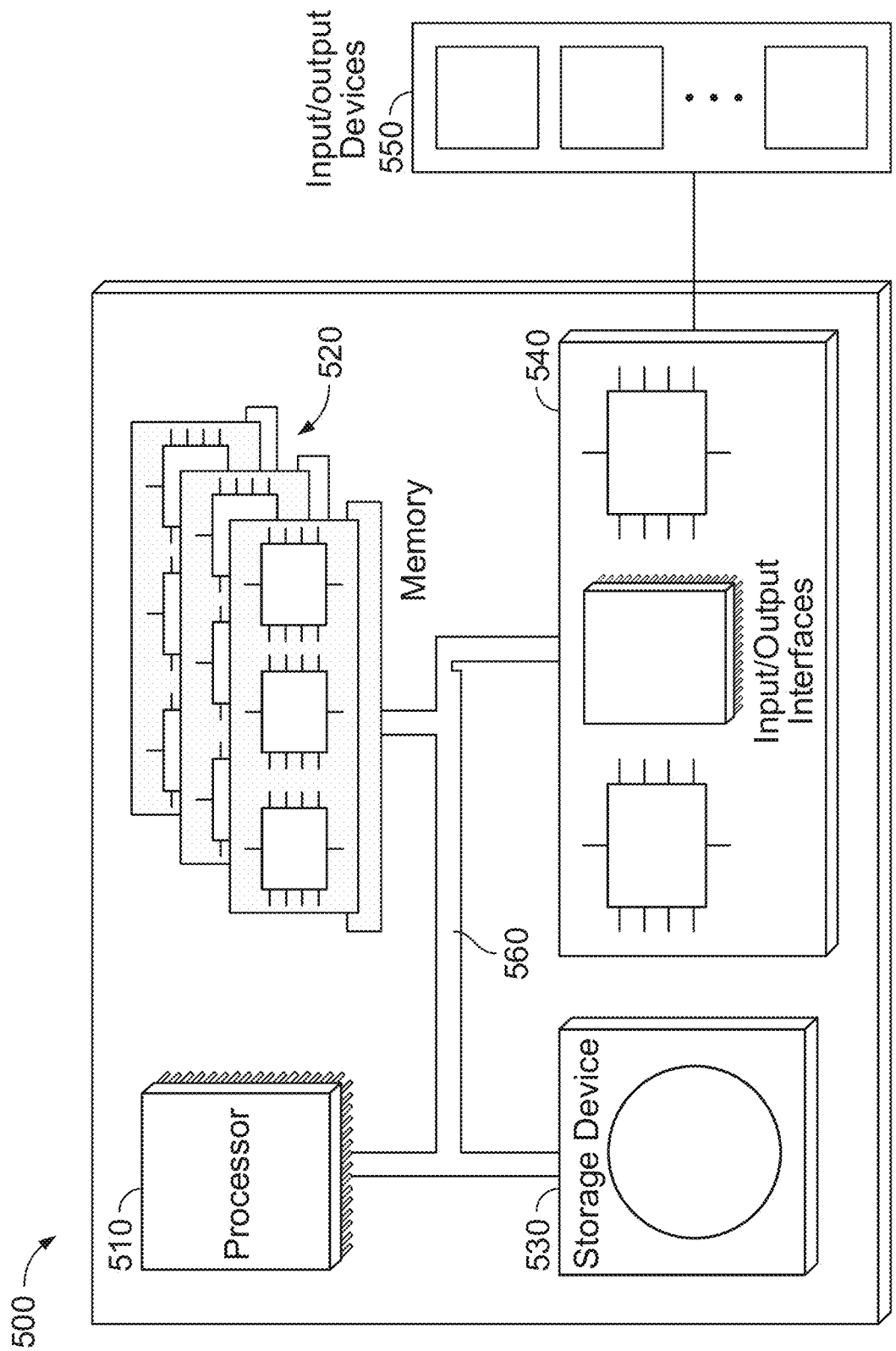
FIG. 5 is a diagram depicting a control system for controlling one or more operational components of a front-loading refuse collection vehicle.

FIG. 5 depicts an example computing system, according to embodiments of the present disclosure. The system 500 may be used for any of the operations or functions described in this disclosure with reference to a computing device. For example, the system 500 may be included, at least in part, in one or more of onboard computing device 136, logical controller 402 and/or other computing device(s) or system(s) described herein. The system 500 includes one or more processors 510, a memory 520, one or more storage devices 530, and one or more input/output (I/O) devices 550 controllable via one or more I/O interfaces 540. The various components 510, 520, 530, 540, or 550 may be interconnected via at least one system bus 560, which may enable the transfer of data between the various modules and components of the system 500.

The system bus 560 may include a series of wired or wireless connections. In some embodiments, the system bus includes a CAN network bus operating under the J1939 protocol.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. For example, the processor(s) 510 may execute instructions for the various software module(s) described herein. The processor(s) 510 may include hardware-based processor(s) each including one or more cores. The processor(s) 510 may include general purpose processor(s), special purpose processor(s), or both.

The memory 520 may store information within the system 500. In some embodiments, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some embodiments, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some embodiments, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a joystick, keypad, keyboard, a mouse, a pen, a game controller, a touch input device (e.g., a touch pad), an audio input device (e.g., a microphone), a gestural input device, a haptic input device, an image or video capture device (e.g., a camera), a mobile device, or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more communication networks using any network protocol.

Computing devices of the system 500 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some embodiments, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), embodiments are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

A number of embodiments have been described. Nevertheless, it will be understood that various modifications may be made without departing from the spirit and scope of the disclosure. Accordingly, other embodiments are within the scope of the following claim(s).

For example, while the cab of the refuse vehicle is described above as featuring a compartment for a human driver, in some embodiments the refuse vehicle can be operated autonomously or semi-autonomously.

As another example, while the front lift of the refuse collecting body is described above as including a fork assembly driven by a fork actuator, in some embodiments the body is equipped with a forkless mechanism for coupling the front arm assembly to a waste container, such as a customer-controlled commercial or residential container or an intermediate carry can (e.g., a Curotto-Can™).

As yet another example, the above described sensing devices for monitoring the state of the surrounding environment and/or the state of the operational components of the vehicle chassis and refuse collecting body may take a variety of forms within the scope of this disclosure. For example, the sensing devices can include, but are not limited to, an analog sensor, a digital sensor, a CAN bus sensor, a magnetostrictive sensor, a radio detection and ranging (RADAR) sensor, a light detection and ranging (LIDAR) sensor, a laser sensor, an ultrasonic sensor, an infrared (IR) sensor, a stereo camera, a three-dimensional (3D) camera, or a combination thereof.

As yet another example, while the front arms of the front lift are described above as having U-shaped configuration, various other shapes, dimensions, and configurations are also envisioned within the scope of this disclosure. For example, the form of the front arms can be optimized to accommodate the magnitude and location of the applied torque load.

As yet another example, while the description above indicates that the arm actuator resides near the storage container, in some embodiments, the arm actuator resides in front of or at least partially (e.g., entirely) beneath the storage container. Additionally, in some embodiments, the arm actuator is directly attached to and supported by a portion of the vehicle chassis. Additionally, in some embodiments, the arm actuator is directly attached to and supported by a portion of the vehicle body (e.g., the storage container).

As yet another example, while the arm actuator is described above as including a pair of actuator assemblies, in some embodiments the arm actuator may include a single actuator assembly or more than two actuator assemblies.

As yet another example, while the actuator assemblies are described above as being arranged coaxially, in some embodiments the actuator assemblies can be arranged on parallel or offset axes.

As yet another example, while the actuator assemblies are described above as being uncoupled from one another, some embodiments may include a logical or structural link between them (e.g., to enhance stability and/or to synchronize timing).

As yet another example, while the actuator assemblies are described above as being structurally identical, in some embodiments, the actuator assemblies are dissimilar. In some embodiments, the actuator assemblies may include different motor or gear set configurations. In some embodiments, the actuator assemblies may produce different speed and torque outputs.

As yet another example, while the electric motor of the actuator assemblies is described above as a direct current permanent magnet motor, in some embodiments, the electric motor is a series DC motor, a shunt DC motor, or a compound DC motor. Additionally, in some embodiments, the electric motor is an AC motor. Additionally, in some embodiments, the electric motor can be replaced with a different type of torque/power producing machine.

As yet another example, while the electric motor of the actuator assemblies is described above as directly driving a gear set, some embodiments may include intermediate operational drive components (e.g., power/torque producing or transmission devices like motors, gears, shafts, tubes, etc.). Similarly, while the gear set of the actuator assemblies is described above as directly driving the proximal end of the front arm, some embodiments may include intermediate operational drive components (e.g., power/torque producing or transmission devices like motors, gears, shafts, tubes, etc.). Additionally, some embodiments may employ the electric motor to directly drive the proximal end of the front arm.

As yet another example, while the gear set of the actuator assemblies is described above as an epicyclic gear set, some embodiments may employ any combination of epicyclic gears, spur gears, straight or spiral bevel gears, worm gears, hypoid gears, helical gears, herringbone gears, etc. Additionally, while the gear set is described above as including three gear reduction stages, other embodiments may employ more or fewer stages. Additionally, the stages of the gear set may have identical or different gear ratios.

As yet another example, while the connection between the gear set and the proximal end of the front arm is described above as a connection of mating axial splines, other embodiments may employ helical splines. Additionally, some embodiments may employ involute splines, crowned splines, serrated splines, and/or parallel splines. Additionally, some embodiments may employ different types of torque transmitting connections (e.g., welded connections, mechanically fastened connections, keyed connections, etc.).

As yet another example, while the control loop is described and illustrated above as including separate logical controller, converter, and battery pack components, one or more of these components may be combined or integrated. For example, the converter may be integrated with the logical controller in a single computing device. Alternatively, the converter may be integrated with the battery pack. Alternatively, all three components may be integrated within a single module.

As yet another example, while the logical controller is described and illustrated above as if it is dedicated to operating the arm actuator, in some embodiments the logical controller may be integrated with one or more other onboard computing devices that control different assemblies or systems of the vehicle chassis or refuse collecting body.

As yet another example, while the converter is described above as a pulse width modulation converter, any suitable device for regulating supply voltage and/or current to an electric motor can be used within the scope of this disclosure (e.g., a variable frequency drive).

As yet another example, while elements of the control loop are described above as using electrical power from the battery pack to drive movement of the front arms, in some embodiments, the weight of the front arms (and the load they carry) can be used to drive the electric motor during the decent of the arms to generate power that charges the battery pack.

What is claimed is:

1. A refuse collection vehicle, comprising:
   a cab;
   a vehicle chassis coupled to the cab, the vehicle chassis defining a forward and rearward direction of travel; and
   a refuse body coupled to and supported on the vehicle chassis, the refuse body comprising:
      a storage container; and
      a front lift comprising:
         an arm assembly configured to rotate pivotally along a pivot axis between a raised position and a lowered position; and
         an arm actuator comprising a first actuator assembly coupled to a first arm of the arm assembly and a second actuator assembly coupled to a second arm of the arm assembly,
         wherein the first actuator assembly and the second actuator assembly are coaxially aligned along the pivot axis and uncoupled from one another along the pivot axis,
         wherein the first actuator assembly comprises:
            an electric motor; and
            a gear set comprising an output shaft, the gear set coupled with the electric motor and coaxially aligned with the electric motor along the pivot axis, the output shaft inserted through at least a portion of a proximal end of the first arm, and
         wherein the refuse body comprises a pair of exterior side walls, and wherein a portion of the first actuator assembly resides within a limited space that extends no further in a transverse direction than an extent of the exterior side walls.

2. The refuse collection vehicle of claim 1, wherein the first actuator assembly and the second actuator assembly are physically uncoupled from one another along the pivot axis.

3. The refuse collection vehicle of claim 1, wherein the output shaft of the gear set is directly connected to the proximal end of the first arm by a torque-transmitting coupling.

4. The refuse collection vehicle of claim 3, wherein:
   an outer circumferential surface of the output shaft engages an interior circumferential surface of a shaft collar defined by the proximal end of the first arm; and
   the torque-transmitting coupling comprises a set of axial splines on the outer circumferential surface of the output shaft that engage a set of mating axial splines on the interior circumferential surface of the shaft collar.

5. The refuse collection vehicle of claim 1, wherein the electric motor is a first electric motor, wherein the gear set is a first gear set, and wherein the second actuator assembly comprises a second electric motor and a second gear set.

6. The refuse collection vehicle of claim 5, further comprising:
   a controller configured to control operation of both the first electric motor and the second electric motor.

7. The refuse collection vehicle of claim 6, wherein the first actuator assembly and the second actuator assembly are logically uncoupled, such that the controller is configured to control operation of the first electric motor independent of the second electric motor.

8. The refuse collection vehicle of claim 7, wherein the controller is configured to control the first electric motor to rotate according to a first rotational direction and to control the second electric motor to rotate according to a second rotational direction that is different from the first rotational direction.

9. The refuse collection vehicle of claim 8, wherein the controller is configured to control the first electric motor and the second electric motor to output substantially similar shaft speed or torque.

10. The refuse collection vehicle of claim 6, wherein the controller is configured to detect a failure of the first electric motor and, in response to detecting the failure, modify operation of the second electric motor.

11. The refuse collection vehicle of claim 10, wherein the controller is configured to modify operation of the second electric motor by increasing a magnitude of a supply voltage to the second electric motor.

12. The refuse collection vehicle of claim 10, wherein the controller is configured to modify operation of the second electric motor by reversing a polarity of a supply voltage to the second electric motor.

13. The refuse collection vehicle of claim 5, wherein the first electric motor and the second electric motor are structurally identical, and wherein the first gear set and the second gear set are structurally identical.

14. The refuse collection vehicle of claim 5, wherein at least one of the first gear set or the second gear set comprises an epicyclic arrangement with three reduction stages.

15. The refuse collection vehicle of claim 5, wherein at least one of the first gear set or the second gear set comprises at least one of:
   a length-to-diameter ratio of between 4 and 11; or
   a total gear ratio of between 97 and 229.

16. The refuse collection vehicle of claim 5, wherein at least one of the first electric motor or the second electric motor comprises a length-to-diameter ratio of between 0.7 and 1.8.

17. The refuse collection vehicle of claim 5, wherein at least one of the first actuator assembly or the second actuator assembly comprises a torque density of between 778-1,817 Nm/inch.

18. The refuse collection vehicle of claim 1, wherein the arm actuator resides rearward of the cab and rearward of a front axle of the vehicle chassis.

19. The refuse collection vehicle of claim 1, wherein the portion of the first actuator assembly comprises a total mass of the first actuator assembly.

20. The refuse collection vehicle of claim 1, wherein the portion of the first actuator assembly comprises the electric motor.

\* \* \* \* \*